April 27, 1937.  F. W. WILKENING ET AL  2,078,519
PISTON RING FOR OIL CONTROL AND COMPRESSION
Filed June 1, 1932  2 Sheets-Sheet 1
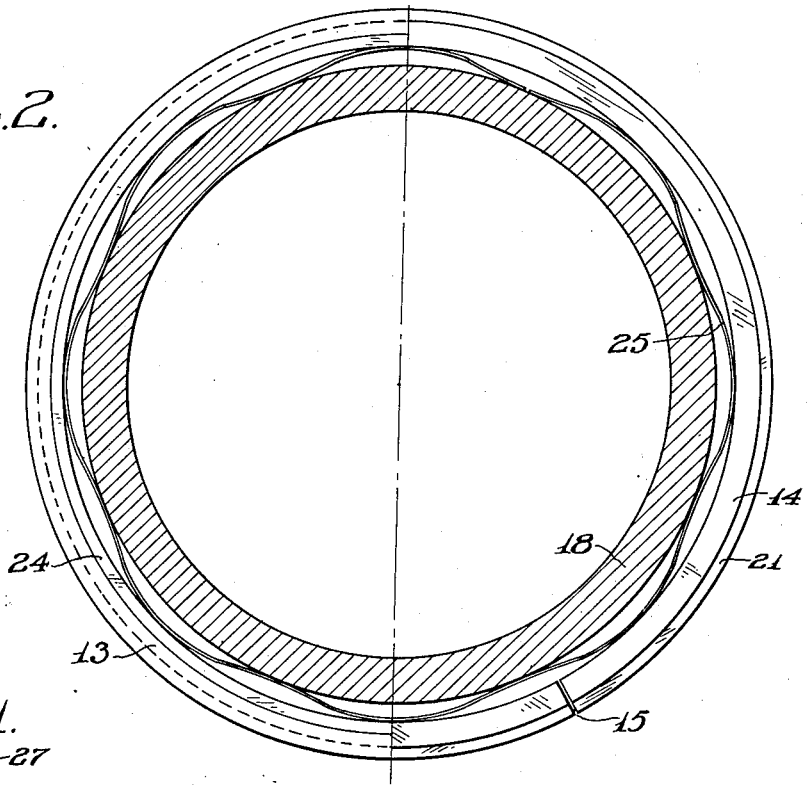
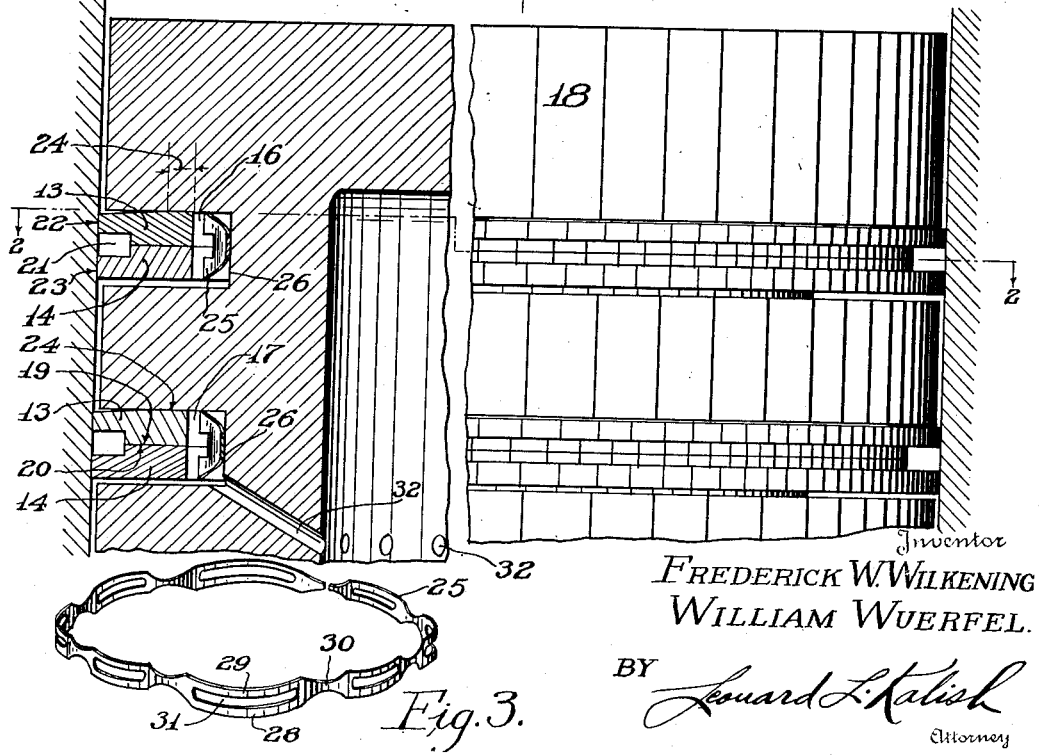
Inventor
FREDERICK W. WILKENING
WILLIAM WUERFEL.
BY Leonard L. Kalish
Attorney

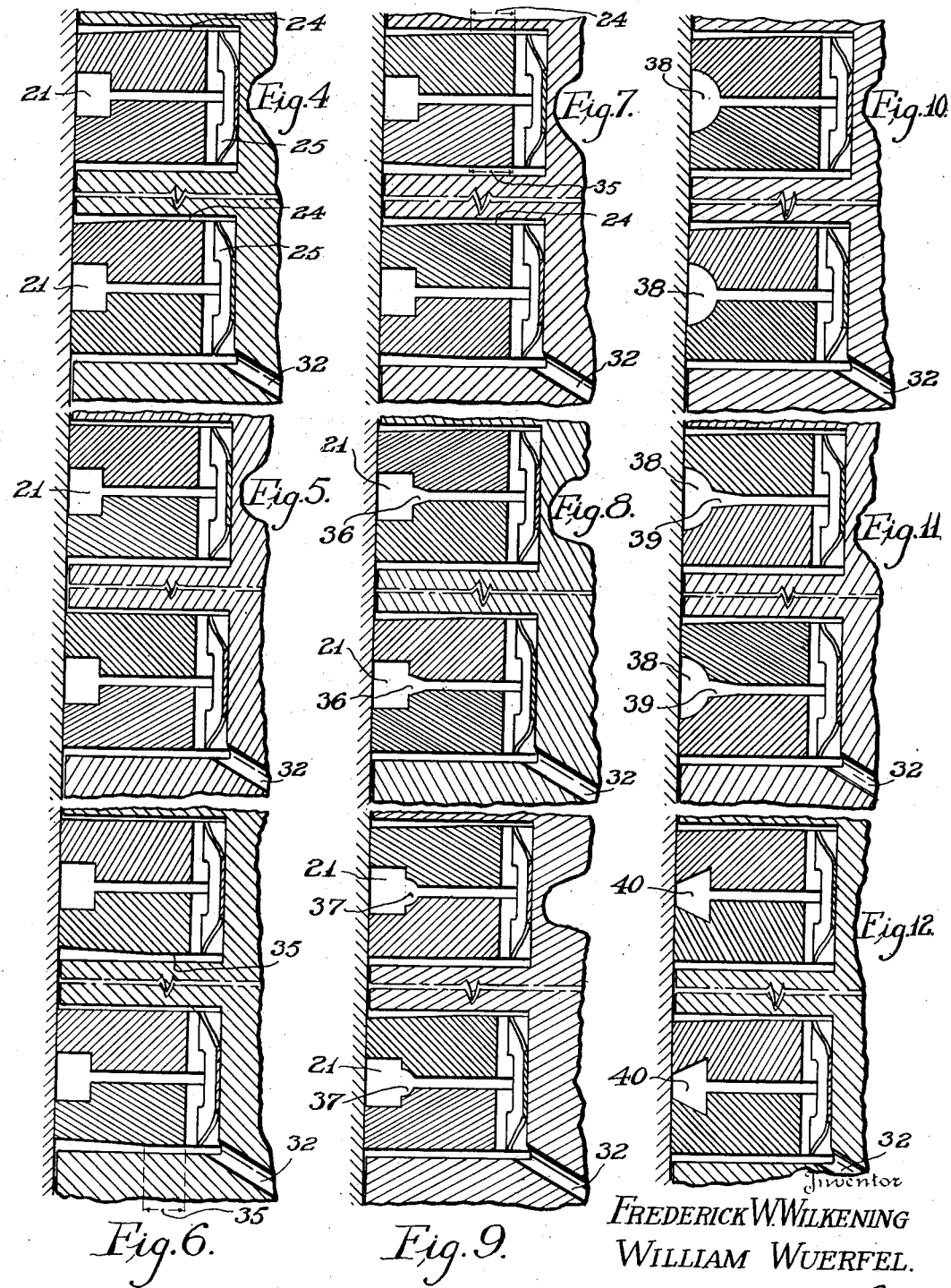

Patented Apr. 27, 1937

2,078,519

UNITED STATES PATENT OFFICE 2,078,519

PISTON RING FOR OIL CONTROL AND COMPRESSION

Frederick W. Wilkening, Narberth, and William Wuerfel, Philadelphia, Pa., assignors to Wilkening Manufacturing Company, Philadelphia, Pa., a corporation of Delaware Application June 1, 1932, Serial No. 614,676

4 Claims. (Cl. 309—45)

Our invention relates to a new and useful piston and ring construction, whereby the same piston ring may effectively serve in the capacity of an "oil control" ring and also in the capacity of a "compression" ring, particularly in replacement installations.

Our invention relates more particularly to a novel piston ring construction whereby the same piston ring will effectively and efficiently serve to maintain "compression" when placed in an imperforate ring-receiving groove, and will also effectively and efficiently serve as an "oil-control" ring when placed in a perforated or drilled ring-receiving groove.

An object of our invention is to provide a piston ring construction which may be interchangeably placed into drilled and undrilled, or perforated or imperforate ring-receiving grooves of pistons, and which will function efficiently in both types of ring-receiving grooves by the interposition of a film or layer of oil between the multiplicity of component annular members constituting the piston ring, and between the piston ring and the side walls of the ring-receiving groove.

A further object of our invention is to provide a piston ring construction which in addition to the foregoing, may be manufactured at a low cost and which will not only be efficient as stated above, in its dual capacity, but which will also be durable and not be readily subject to breakage; either during manufacture, installation, or during use.

With the above and other objects in view, our invention consists of a novel piston ring construction, wherein each piston ring is composed of two split annular ring members having plane and unbroken juxtaposed surfaces (broken only at the split in the ring) and having an outer oil collector channel or groove divided between the two component ring members;—the aggregate width of the two component ring members being substantially less than the width of the ring-receiving groove, and the side-seating surface of one of the ring members (preferably the upper one) being substantially less than the side-seating surface of the other component ring members;—the two or more component ring members or elements of each piston ring being generally flexible and being urged outwardly in a radial direction by means exerting a generally equalized force on the two component ring members and distributed generally circumferentially.

Our invention consists of other novel features of construction, and modifications of our construction, all of which will appear more fully from the following detailed description.

For the purpose of illustrating our invention we have shown in the accompanying drawings forms thereof which are at present preferred by us, since the same have been found in practice to give satisfactory and reliable results, although it is to be understood that the various instrumentalities of which our invention consists can be variously arranged and organized, and that our invention is not limited to the precise arrangement and organization of the instrumentalities as herein shown and described.

Referring to the drawings in which like reference characters indicate like parts, Figure 1 represents a side elevational view of piston rings embodying our invention, the left side of said piston rings being shown in section;

Figure 2 represents a section on line 2—2 of Figure 1, on a reduced scale.

Figure 3 represents a perspective view of the expander spring element, on a still further reduced scale.

Figure 4 represents a fragmentary sectional view of a piston ring embodying our invention, similar to that shown in Figure 1, but with the ring elements disposed within the ring-receiving groove, in a manner illustrating the possible spacing of the rings within the groove.

Figures 5 to 12 inclusive represent a fragmentary sectional view, similar to that shown in Figure 4, illustrating a modified embodiment of our invention.

In carrying out our invention, we provide two annular cast-iron ring elements 13 and 14, (Figure 1), one pair constituting a complete piston ring. The ring elements 13 and 14 are split in the usual manner, as at 15, so as to permit their radial expansion and contraction within the limits necessary, and so as to permit their installation in the ring-receiving grooves 16 and 17 of pistons 18.

The component annular ring elements 13 and 14 are generally of equal maximum width and are provided with plane juxtaposed, co-acting surfaces 19 and 20, respectively, which are devoid of any transverse or generally radial recesses or interruptions (with the exception of the minute gap at the "split"), so as to provide plane parallel coacting surfaces in juxtaposition to each other, on the two component ring elements, which will possess the maximum surface obtainable.

An annular groove or channel 21 is provided in the outer periphery of the piston ring, divided generally between the two component ring elements 13 and 14 thereof; (Figure 1) the width of said groove or channel being approximately one-third of the aggregate width of the piston ring (including both members thereof). The remaining outermost peripheries of the two component ring members 13 and 14 are cylindrical and generally equal in axial width;—the width of one of said two cylindrical cylinder-contact surfaces 22 and 23, being possibly very slightly less than the width of the other cylindrical cylinder-contact surface, owing to the very slight chamfer (approximately 5 degrees) effecting the outermost edge of one of the component ring members.

One of the component ring members, preferably the component ring member nearest to the combustion chamber, is slightly chamfered, as indicated in both instances in Figure 1;—said chamfer extending inwardly to approximately two-thirds the radial width of the ring, so that the chamfered ring member 13 (Figure 1) will have a plane side-seating surface 24, one-half or less than one-half the total axial width of the ring.

The aggregate or over-all axial width of the two component ring members is made substantially less (approximately eight-to-ten-thousandths of an inch less) than the axial width of the parallel walled ring-receiving grooves 16 and 17, so that the composite piston ring will be entirely loose within the ring-receiving groove.

A flat steel ribbon expander spring 25 is interposed between the inner periphery of the component ring members 13 and 14 and the innermost wall 26 of the ring-receiving grooves, thereby to urge said component ring members outwardly in a radial direction with the requisite force for effecting the desired contact pressure between the outer cylindrical cylinder-contact surfaces 22 and 23 thereof, and the cylinder wall 27. The radial expander spring 25 is of the generally sinuous, corrugated type, having the outer ring contact points 28 and 29 and the inner groove contact points 30. The ring contact points 28 and 29 are separated by an intervening slot 31, so as to permit an independent flexing thereof, and so as to permit an independent expansion of the two component ring members 13 and 14.

One such composite piston ring, including the ring members 13 and 14 and the expander spring 25 is placed within each of the ring-receiving grooves 16 and 17, (and possibly others) of a piston;—the uppermost ring-receiving groove or the ring-receiving groove nearest to the combustion chamber of the internal combustion engine, being devoid of perforations through the wall of the piston, while one or more of the lower ring-receiving grooves, or those farthest from the combustion chamber, being provided with any suitable perforations or drain holes 32 extending through the piston wall, for permitting the drainage of oil into the crankcase of the engine.

In the operation of this novel piston and piston ring construction, the uppermost composite piston ring coacts with the imperforate ring-receiving groove and the oil accumulated therein, so as effectively to maintain compression and to prevent blow-by of the gases, while the composite piston ring in the lower ring-receiving groove or grooves coacts with the perforated ring-receiving groove and the oil accumulated therein, effectively to drain the excess oil and to prevent its access to the combustion chamber.

Numerous elements enter into the accomplishment of the above results. Thus, one of the elements which enters into the accomplishment of the above results is the formation of a layer of oil in the axial clearance spaces between the component ring members and between the latter and the side walls of the ring-receiving grooves. Thus, owing to the very substantial axial clearances, layers of oil are formed between the flat surfaces, which are then acted upon or pressed upon by the component ring members as the frictional contact between the rings and the cylinder wall tends to force the loosely fitted ring members towards the top or the bottom of the ring-receiving grooves, depending upon the direction of travel of the piston, and also as the compressed gas may act upon the uppermost ring, and more particularly as the force of inertia of the ring members tends to force the same towards the top or bottom of the ring-receiving groove.

This action of the oil and the coaction of the rings with the ring-receiving grooves, serves to form an effective seal at the top of the piston against the passage or "blow-by" of gases, either past or behind the ring, while the same coaction serves to eliminate excess oil at the lower rings and to deliver the said excess oil back into the crankcase.

Owing to the uninterrupted juxtaposed plane surfaces on the two opposed ring members constituting each composite ring, a uniform and unbroken oil layer is formed between the rings, and as the rings are urged towards the top and bottom of the ring-receiving grooves, by the friction between rings and cylinder wall, the layer of oil is forced out slightly and then replenished when the pressure is relieved. This causes a gradual passage of oil between the component ring members in an inward radial direction. Owing also to the uninterrupted character of the juxtaposed and coacting, plane parallel surfaces of the opposed ring members constituting each ring, each of the said ring members is provided with the maximum cross-sectional area and hence the maximum strength permitted by the given size, and hence the rings are not subjected to the usual and frequent breakage during manufacture, handling, installation, and use.

Owing to the fact that the rings are urged outwardly in a radial direction by the expander springs 25, with generally uniformly distributed pressure, the rings may be made without any outward tension set into the rings, so that the outward radial expansion of the rings is derived solely from the expander springs. If desired however, the rings themselves may also be tensioned.

The purpose of the slight chamfer on one of the rings is to greatly diminish the side-seating surface of the particular ring member, without materially diminishing the effective area of its cylindrical cylinder-contact surface. By this means the film of oil is cut through more readily by the diminished side-seating surface when the axial pressure is produced by the frictional engagement between the rings and cylinder wall.

In Figure 4 we have illustrated the ring so as to show the possible positioning thereof within the ring-receiving groove.

In Figures 5 to 12 inclusive, we have illustrated modified embodiments of our novel construction.

Thus, in Figure 5 we have illustrated an embodiment of our construction, wherein the side-seating surfaces of the two component members are equal. In Figure 6 we have illustrated a modified embodiment of our novel ring construction wherein the lower side-seating surface 35 is the one diminished in area.

In Figure 7 we have illustrated a further modified embodiment of our invention wherein the side-seating surfaces of both top and bottom component ring members are reduced in area, so that the maximum layer of oil will be maintained between the two component ring members and but a very slight film of oil will be maintained between the side-seating surfaces of the ring members and the side walls of the ring receiving groove, which slight films of oil may at times verge on a metal-to-metal contact at the reduced side-seating surfaces, particularly under the influence of the axial pressure produced by the friction between the rings and the cylinder wall, and under the influence of gas pressure and inertia.

Figure 8 represents a further embodiment of our invention, wherein the channel 21 is provided with an innermost guiding channel 36, of tapered cross-section, tending to lead the oil to the space between the rings.

Figure 9 represents a further embodiment of our invention, wherein the guide channel 37, augmenting the oil collector groove 21, is of a generally semi-circular cross-section.

Figure 10 represents a further embodiment of our invention, wherein the oil collector groove 38 is of a generally semi-circular or generally round cross-section.

Figure 11 represents a further embodiment or modification of our invention, wherein the generally rounded oil-collector groove 38 is augmented by a guiding channel 39 of tapered cross-section.

Figure 12 represents a further modification of our invention, wherein the oil collector groove 40 is inwardly enlarged.

It should be observed that the chamfer is so slight that it has the effect of materially reducing the effective side-seating area of the ring-member, without materially decreasing the cylindrical cylinder-contact surface of the said ring-member, and also without varying the outer edge of the said ring-member materially from the 90° angle. Thus, the chamfering being but a few degrees (about 5°) with respect to the plane at a right angle to the axis, no substantially obtuse angle edge is presented by the piston ring members to the cylinder wall. A substantially obtuse scraping edge would have the tendency to ride completely over the film of oil on the cylinder wall without effectively removing any of it by scraping action. This is avoided in the instant construction.

Having thus described our invention, what we hereby claim as new and desire to secure by Letters Patent, is:

1. A composite two-piece piston ring, adapted for use in internal combustion engines in combination with a cylinder and a piston thereof having a plurality of ring-receiving grooves, the one farthest from the combustion chamber having a passageway associated therewith for maintaining communication with the interior of the piston wall, the one nearest the combustion chamber being imperforate and non-communicating with the interior of the piston, said composite two-piece piston ring being adapted to be disposed within at least each of two of said ring-receiving grooves of said piston, each of said composite piston rings comprising two annular ring members having uniform transverse cross-sectional areas throughout their respective circumferences;—the aggregate overall axial width of each of said composite piston rings, (including their two ring members), being substantially less than the axial width of the corresponding ring-receiving groove, thereby creating a substantial axial clearance, sufficient to permit the maintenance of a layer of oil in said clearance and to permit the passage of oil in an inward radial direction from the cylinder wall to the interior of the ring-receiving groove behind each of said composite piston rings, respectively, an oil collector groove for each of said composite piston rings, for gathering oil from the cylinder wall into said clearance.

2. A composite two-piece piston ring, adapted for use in internal combustion engines in combination with a cylinder and a piston thereof having a plurality of ring-receiving grooves, the one farthest from the combustion chamber having a passageway associated therewith for maintaining communication with the interior of the piston wall, the one nearest the combustion chamber being imperforate and non-communicating with the interior of the piston, said composite two-piece piston ring being adapted to be disposed within at least each of two of said ring-receiving grooves of said piston, each of said composite piston rings comprising two annular ring members having uniform transverse cross-sectional areas throughout their respective circumferences;—the aggregate overall axial width of each of said composite piston rings, (including their two ring members), being substantially less than the axial width of the corresponding ring-receiving groove, thereby creating a substantial axial clearance, sufficient to permit the maintenance of a layer of oil in said clearance and to permit the passage of oil in an inward radial direction from the cylinder wall to the interior of the ring-receiving groove behind each of said composite piston rings, respectively, an oil collector groove for each of said composite piston rings, for gathering oil from the cylinder wall into said clearance, one of the annular ring members of the composite two-piece piston ring having an outer side-seating surface of an area less than the outer side-seating surface of the other annular ring member of the composite two-piece piston ring.

3. A composite two-piece piston ring, adapted for use in internal combustion engines in combination with a cylinder and a piston thereof having a plurality of ring-receiving grooves, the one farthest from the combustion chamber having a passageway associated therewith for maintaining communication with the interior of the piston wall, the one nearest the combustion chamber being imperforate and non-communicating with the interior of the piston, said composite two-piece piston ring being adapted to be disposed within at least each of two of said ring-receiving grooves of said piston, each of said composite piston rings comprising two annular ring members having uniform transverse cross-sectional areas throughout their respective circumference;—the aggregate overall axial width of each of said composite piston rings, (including their two ring members), being substantially less than the axial width of the corresponding ring-receiving groove, thereby creating a substantial axial clearance, sufficient to permit the maintenance of a layer of oil in said clearance and to permit the passage of oil in an inward radial direction from the cylinder wall to the interior of the ring-receiving groove behind each of said composite piston rings, respectively, an inwardly enlarged oil collector groove for each of said composite piston rings, for gathering oil from the cylinder wall into said clearance.

4. A composite two-piece piston ring, adapted for use in internal combustion engines in combination with a cylinder and a piston thereof having a plurality of ring-receiving grooves, the one farthest from the combustion chamber having a passageway associated therewith for maintaining communication with the interior of the piston wall, the one nearest the combustion chamber being imperforate and non-communicating with the interior of the piston, said composite two-piece piston ring being adapted to be disposed within at least each of two of said ring-receiving grooves of said piston, each of said composite piston rings comprising two annular ring members having uniform transverse cross-sectional areas throughout their respective circumferences;—the aggregate overall axial width of each of said composite piston rings, (including their two ring members), being substantially less than the axial width of the corresponding ring-receiving groove, thereby creating a substantial axial clearance, sufficient to permit the maintenance of a layer of oil in said clearance and to permit the passage of oil in an inward radial direction from the cylinder wall to the interior of the ring-receiving groove behind each of said composite piston rings, respectively, an inwardly enlarged oil collector groove for each of said composite piston rings, for gathering oil from the cylinder wall into said clearance, one of the annular ring members of the composite two-piece piston ring having an outer side-seating surface of an area less than the outer side-seating surface of the other annular ring member of the composite two-piece piston ring.

FREDERICK W. WILKENING.
WILLIAM WUERFEL.